United States Patent
Reichel et al.

(10) Patent No.: US 8,043,401 B2
(45) Date of Patent: Oct. 25, 2011

(54) METHOD FOR THE REDUCTION OF A SLAG HAVING A HIGH DEGREE OF CHROMIUM IN AN ELECTRIC ARC FURNACE

(75) Inventors: Johann Reichel, Düsseldorf (DE); Lutz Rose, Duisburg (DE)

(73) Assignee: SMS Siemag Aktiengesellschaft, Dusseldorf (DE)

( * ) Notice: Subject to any disclaimer, the term of this patent is extended or adjusted under 35 U.S.C. 154(b) by 0 days.

(21) Appl. No.: 12/449,424

(22) PCT Filed: Jan. 10, 2008

(86) PCT No.: PCT/EP2008/000138
§ 371 (c)(1),
(2), (4) Date: Aug. 7, 2009

(87) PCT Pub. No.: WO2008/095575
PCT Pub. Date: Aug. 14, 2008

(65) Prior Publication Data
US 2010/0089202 A1    Apr. 15, 2010

(30) Foreign Application Priority Data
Feb. 9, 2007    (DE) .................. 10 2007 006 529

(51) Int. Cl.
  C21B 13/12    (2006.01)
  C21C 7/00    (2006.01)
(52) U.S. Cl. ............... 75/10.24; 75/10.42; 75/10.48; 75/10.63
(58) Field of Classification Search .............. 75/10.63, 75/10.24, 10.48, 10.42
See application file for complete search history.

(56) References Cited

U.S. PATENT DOCUMENTS

| | | | | |
|---|---|---|---|---|
| 5,395,420 A | * | 3/1995 | Masucci | 75/10.41 |
| 5,916,827 A | * | 6/1999 | Vayda | 44/580 |
| 2002/0040623 A1 | * | 4/2002 | Stendera et al. | 75/10.12 |
| 2006/0260435 A1 | | 11/2006 | Rose et al. | |
| 2007/0051200 A1 | * | 3/2007 | Vayda | 75/327 |

FOREIGN PATENT DOCUMENTS

| | | |
|---|---|---|
| DE | 102006004532 | 8/2007 |
| EP | 0 655 508 | 5/1995 |
| EP | 0 829 545 | 3/1998 |
| WO | 00/14287 | 3/2000 |
| WO | 2004/104232 | 12/2004 |

\* cited by examiner

*Primary Examiner* — George Wyszomierski
*Assistant Examiner* — Tima M McGuthry Banks
(74) *Attorney, Agent, or Firm* — Lucas & Mercanti, LLP; Klaus P. Stoffel

(57) ABSTRACT

During the production of stainless steel, a slag is formed during the melting of the solid material in the electric arc furnace, the slag having a high degree of metal oxides, particularly chromium oxide. The chromium concentration often reaches values of more than 30%. Currently, such slags cannot be reduced to a desired degree due to their composition. In order to minimize the resulting high loss of recyclable material, the invention provides to charge the electric arc furnace with pellets, or briquettes (8), which are made of a defined mixture of an iron carrier as the ballast material, carbon, or carbon and silicon, as the reducing agent, and a binder, wherein they react beneath the slag layer (7) in the steel melt (6) with the metal oxides of the slag (7), particularly with the chromium oxide present, in a floating, chemical, and reducing manner. The reaction gases (12) produced in the process, which are mainly made of carbon monoxide, advantageously support a foaming of the slag (7).

9 Claims, 1 Drawing Sheet

Figure 1:
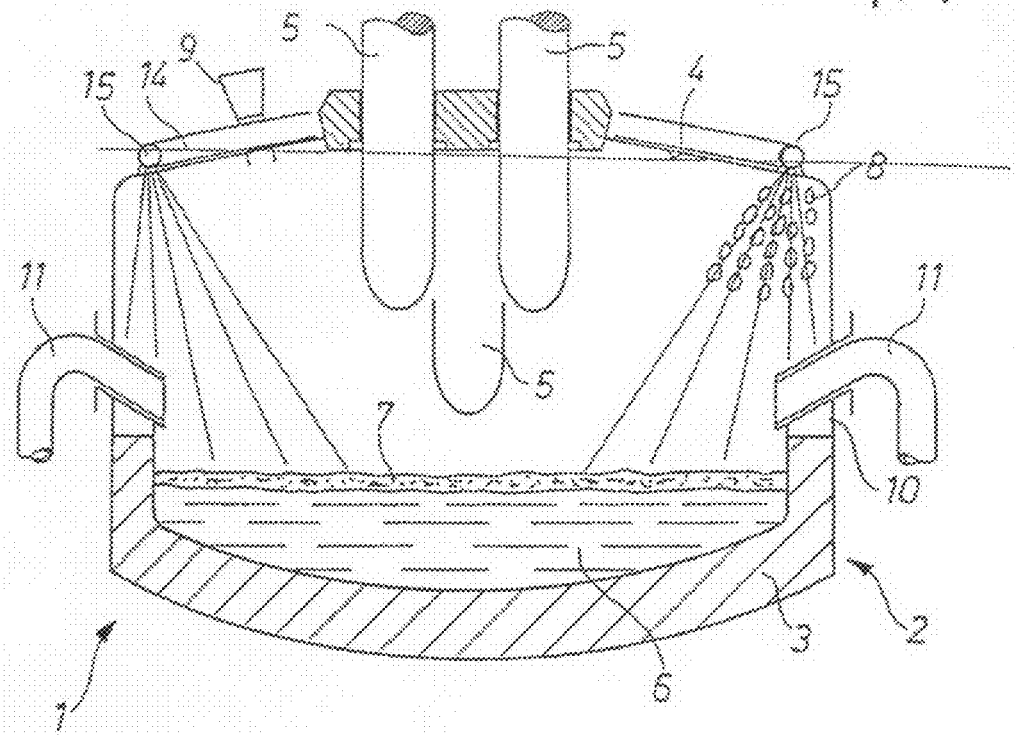

METHOD FOR THE REDUCTION OF A SLAG HAVING A HIGH DEGREE OF CHROMIUM IN AN ELECTRIC ARC FURNACE

The invention pertains to a method for the reduction of a high chromium-content slag present on the steel melt during the production of stainless steel in an electric-arc furnace, according to which method molded bodies such as pellets or briquettes containing substances which enter into a reducing reaction with the slag are added to the slag.

During the operation of electric-arc furnaces, the added solid materials, primarily scrap and alloys, are melted by the arcs of the electrodes, which project down from above into the furnace vessel. In addition to its primary function, namely, the removal of undesirable components from the melt, the slag also serves a protective function, because it partially fills the space between the tips of the electrodes and the surface of the metal and protects the refractory lining of the furnace from the radiant energy of the electric arc. This protective function of the slag can be improved by using suitable methods to foam the slag.

To this end, EP 0 829 545 B1 proposes a method for the production of a foam slag on molten stainless steel in an electric furnace, wherein a powder is introduced into the slag by means of an injection medium such as nitrogen, this powder consisting of a metal oxide, i.e., either zinc oxide or lead oxide, and carbon. The oxide in the powder is reduced by reaction with the carbon. Bubbles, consisting essentially of carbon monoxide, are thus formed in the slag. These bubbles cause the slag to foam up. Because of the relatively large surface area associated with substances in powdered form, there is a short but vigorous reaction with the slag, which takes place in the molten bath in a limited area near the injection or blowing device.

To avoid the disadvantages of the introduction of powdered substances, it is proposed in WO 2004/104232 A1 that the materials used to foam up the slag, namely, a mixture of metal oxide and carbon, be charged into the electric furnace in the form of press-molded bodies. The density of these molded bodies is adjusted in such a way that they float in the slag, preferably near the phase boundary between the melt and the slag.

During the production of stainless steel, a slag which contains a large amount of metal oxides, primarily chromium oxide, is formed during the melting of the solid material in the electric-arc furnace. The concentration of chromium oxide often reaches values of more than 30%. Because of their composition, it has been impossible so far to reduce these slags to the desired extent.

To minimize the undesirable loss of valuable material attributable to the high chromium oxide content in the slag, the goal of the invention consists in providing a method for reducing the slag of a stainless steel melt, namely, a method which makes use of the positive results with respect to foaming the slag obtained by the addition of press-molded bodies to the electric-arc furnace.

The goal thus formulated is achieved by the characterizing features of Claim 1, in that the pellets or briquettes charged into the electric-arc furnace consist of a defined mixture of an iron carrier as ballast material, carbon or carbon plus silicon as reducing agent, and a binder material, and in that the pellets or briquettes chemically react under the slag layer with the metal oxides of the slag, especially with the chromium oxide contained therein, with a reducing action, wherein the reaction gases which form, chiefly carbon monoxide, support the foaming of the slag.

Advantageous embodiments of the invention are indicated in the subclaims.

The reduction of the chromium oxide of the slag proceeds according to the following reaction equation:

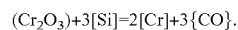

$$(Cr_2O_3)+3[Si]=2[Cr]+3\{CO\}.$$

It replaces to a considerable extent the standard reduction with silicon, that is:

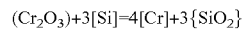

$$(Cr_2O_3)+3[Si]=4[Cr]+3\{SiO_2\}$$

and lowers the cost of the reduction. In addition, the energy balance is improved, because the amount of lime required to adjust the basicity is decreased.

The density of the pellets or briquettes according to the invention is adjusted to a value of 3-4 tons/m$^3$ so that they will float in the melt near the melt/slag phase boundary and can react chemically underneath the slag layer with the metal oxides in the slag This is achieved by properly adjusting the mixing ratio of ballast material to reducing agent. The ballast material consists here primarily of the elements which form stainless steels, namely, iron and chromium, wherein, according to an advantageous embodiment of the invention, fine, low-alloy scrap with a density of approximately 7 tons/m$^3$, finely shredded, can be used as ballast material and iron carrier. Alternatively or in addition, it is possible to use an alloy with the composition FeCrHC (High Carbon) with a content of approximately 8% C and 3% Si as ballast material. The reducing agent, namely, carbon or carbon plus silicon, which is added to these ballast materials is, according to the invention, coke as the carbon carrier and FeSi or alternatively SiC as the silicon carrier. The resulting composition of the pellets or briquettes is determined not only by the density to be achieved by also by the ratio of carbon to FeSi, as a result of which the composition can vary within the following ranges:

coke >60%
FeSi (70-75) >20%
other ballast material >20%
binder <2%

A suitable binder is necessary so that these types of mixtures can be press-molded into solid pellets or briquettes. Molasses and cement have proven reliable, but as an alternative it is also possible to use bitumen, tar pitch, or calcium hydrates for press-molding.

In the production of the pellets or briquettes, it is important to adapt the shape and size obtained and also the degree of compaction obtained to their later use. The time it takes for them to disintegrate during their reaction with the constituents of the slag, especially with the chromium oxide, should allow for optimal reduction. They should therefore be thermally stable and not disintegrate as soon as they are loaded into the hot electric-arc furnace. In addition, they should also have a shape, size, and strength which allows them to be transported pneumatically, so that they can be easily charged into the electric-arc furnace.

The quantities of pellets or briquettes charged into the electric-arc furnace to reduce the chromium oxide in the slag are largely dependent on the grade of steel being produced, wherein the following ranges for the specific distributions of the pellets or briquettes, based on 1 m$^2$ of the metal bath, in the electric-arc furnace apply:

austenite melts: 1-4 kg/ton/m$^2$ of liquid steel
ferrite melts: 1.5-3 kg/ton/m$^2$ of liquid steel.

The speed at which the pellets or briquettes are charged is adjusted to a continuous value of more than 5 kg/ton/min, wherein the pellets or briquettes are charged into the ring-shaped space between the side walls of the furnace and the electrode circle formed by the electrodes in the center of the furnace.

Figure 2:
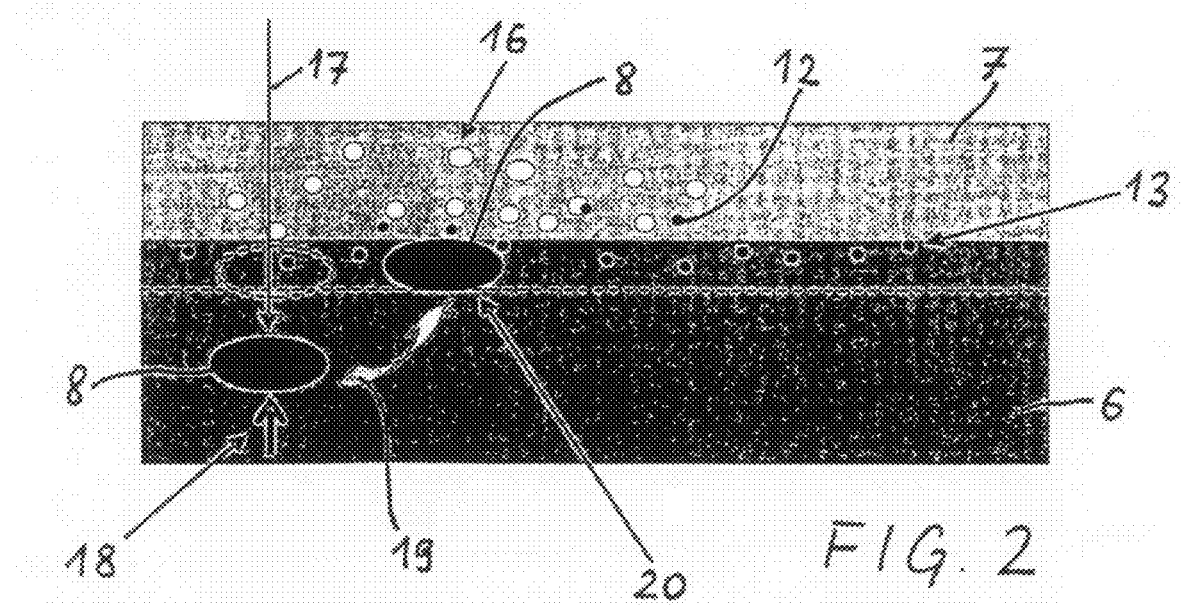

Additional details and advantages of the invention are explained below on the basis of schematic diagrams of an exemplary embodiment:

FIG. 1 shows a cross section through an electric-arc furnace with charging devices for pellets or briquettes; and FIG. 2 shows an enlarged view of the phase boundary formed between the steel melt and the slag floating on top.

The electric-arc furnace 1 shown in FIG. 1 consists of a furnace vessel 2 with refractory walls 3 and a furnace cover 4 and three electrodes 5, which project through the furnace cover 4 and into the furnace vessel from above. In the lower part of the furnace vessel 2, a steel melt 6, on top of which a molten slag 7 floats, is present within the refractory walls 3. For the reduction of the slag, the pellets or briquettes 8 can be charged into the ring-shaped space between the side walls (10) of the furnace and the electrode circle formed by the electrodes 5 in the following ways:

The pellets or briquettes 8 are introduced into the interior of the furnace by a gravitational conveyor system through a hole 9 in the cover.

The pellets or briquettes 8 are introduced into the interior of the furnace by a pneumatic conveyor system through a ring line 14, extending radially to the furnace cover 4 extending in a circle, with charging openings 15.

The pellets or briquettes 8 are introduced into the interior of the furnace pneumatically or by gravity through feed devices 11 arranged in the side walls 10 of the furnace.

On an enlarged scale, FIG. 2 shows the area of the steel/slag phase boundary 13 formed by the slag 7 and the steel melt 6. The arrow 17 indicates a possible route which a briquette 8 charged into the electric-arc furnace 1 can take. After it passes through the slag layer 7, it arrives in the melt 6, but it is still considerably below the melt/slag phase boundary 13 Because of the density difference present versus the melt 6, its buoyancy 18 causes it to perform one possible rising movement 19 while still floating in the melt until it reaches the desired end position 20, directly underneath the melt/slag phase boundary 13. In this position 20 underneath the slag layer 7, the desired reduction reaction with the metal oxides present in the slag, especially with the chromium oxide present here, takes place. Reaction gases 16, primarily carbon monoxide, are released; these are indicated as white circles in the slag layer 7. The briquette residues 12 remaining after the reduction reactions of the briquettes 8 with the slag 7 are indicated as black dots. Because of the change in their composition, some of these briquette residues 12 can now float upward in the slag 7.

LIST OF REFERENCES NUMBERS 1 electric-arc furnace
2 furnace vessel
3 refractory furnace walls
4 furnace cover
5 electrodes
6 steel melt
7 slag
8 pellets or briquettes
9 hole in the cover
10 side walls of the furnace
11 injection line
12 pellet or briquette residues
13 melt/slag phase boundary
14 ring line
15 charging opening
16 reaction gases
17 direction of entry of the pellets or briquettes into the steel melt
18 buoyancy of the pellets or briquettes in the steel melt
19 possible rising movements of the pellets or briquettes in the steel melt
20 desired end position of the pellets or briquettes in the steel melt

The invention claimed is:

1. A method for the reduction of a high chromium-content slag (7) on a steel melt (6) during the production of stainless steel in an electric-arc furnace (1), according to which method press-molded bodies such as pellets or briquettes (8), the constituents of which react with the metal oxides of the slag (7) with a reducing action, are charged additionally into the slag (7), where the pellets or briquettes (8) charged into the electric-arc furnace (1) consist of a defined mixture of a ballast material, carbon or carbon plus silicon as reducing agent, and a binder, and where the pellets or briquettes (8) float in the melt near the melt/slag boundary so as not to be submerged and react chemically under the slag layer with the metal oxides of slag (7), especially with a chromium oxide present therein, with a reducing action, where the resulting reaction gases (16) support the foaming of the slag, wherein the ballast material is comprised primarily of the elements iron and chromium which form the stainless steel, and in that fine, low-alloy scrap with a density of approximately 7 ton/$m^3$, finely shredded, provides the iron for the ballast material.

2. A method according to claim 1, wherein the density of the pellets or briquettes (8) is adjusted to a value of 3-4 tons/$m^3$.

3. A method according to claim 1, including using an alloy of FeCrHC (High Carbon) with a content of approximately 8% C and 3% Si as ballast material.

4. A method according to claim 1, wherein the carbon is present in the pellets or briquettes (8) in the form of coke, and the silicon is present in the form of FeSi or alternatively as SiC.

5. A method according to claim 4, wherein the compaction of the pellets or briquettes (8) during a press-molding operation is conducted in such a way that the time it takes for them to disintegrate during their reaction with the constituents of the slag (7) is adapted to ensure optimal reduction of primarily the chromium oxide.

6. A method according to claim 4, wherein the pellets or briquettes (8) are formed with respect to their size and shape in such a way that pneumatic transport is possible.

7. A method according to claim 1, wherein, depending on the grade of steel being produced, the following different specific distribution quantities, relative to 1 $m^2$ of metal bath, are charged into the electric-arc furnace (1);
austenite melts: 1-4 kg/ton/$m^2$ of liquid steel,
ferrite melts: 1.5-3 kg/ton/$m^2$ of liquid steel.

8. A method according to claim 7, wherein the rate at which the pellets or briquettes are charged is adjusted to a continuous value of more than 5 kg/ton/min.

9. A method according to claim 7, wherein the pellets and/or briquettes are added to a ring-shaped space between the furnace side walls (10) and the electrode circle formed by the electrodes (5).

* * * * *